US011553044B2

(12) United States Patent
Alexander et al.

(10) Patent No.: US 11,553,044 B2
(45) Date of Patent: Jan. 10, 2023

(54) SYSTEMS, DEVICES, AND METHODS FOR REMOTE ACCESS SMARTPHONE SERVICES

(71) Applicant: GOOGLE LLC, Mountain View, CA (US)

(72) Inventors: Stefan Alexander, Elmira (CA); Aaron Grant, Kitchener (CA); Walter J. S. Hermsen, Waterloo (CA); Jacob Glick, Ottawa (CA)

(73) Assignee: GOOGLE LLC, Mountain View, CA (US)

( * ) Notice: Subject to any disclaimer, the term of this patent is extended or adjusted under 35 U.S.C. 154(b) by 82 days.

(21) Appl. No.: 17/072,375

(22) Filed: Oct. 16, 2020

(65) Prior Publication Data

US 2021/0120101 A1    Apr. 22, 2021

Related U.S. Application Data

(60) Provisional application No. 62/916,527, filed on Oct. 17, 2019.

(51) Int. Cl.
*H04L 29/06* (2006.01)
*H04L 67/131* (2022.01)
(Continued)

(52) U.S. Cl.
CPC ............ *H04L 67/131* (2022.05); *G06F 9/452* (2018.02); *H04M 1/72409* (2021.01)

(58) Field of Classification Search
CPC ......... H04L 67/38; H04L 67/10; G06F 9/452; H04M 1/72409; H04M 1/72412
See application file for complete search history.

(56) References Cited

U.S. PATENT DOCUMENTS 10,244,031 B1 * 3/2019 Kulkarni ............... H04L 67/141
10,955,810 B2 * 3/2021 Boss .................. G05B 19/058
(Continued)

FOREIGN PATENT DOCUMENTS

EP        3389336 A1 * 10/2018   ............... G06F 3/14

OTHER PUBLICATIONS

Chiueh et al (Smartphone Virtualization, 2016 IEEE 22nd International Conference on Parallel and Distributed Systems (ICPADS) (Year: 2016).*

*Primary Examiner* — Vivek Srivastava
*Assistant Examiner* — Wuji Chen

(57) ABSTRACT

Systems, devices, and methods for remote access smartphone services are described. The mobile operating system and smartphone applications are stripped out of smartphone hardware and stored as a virtual smartphone instance at a host server. The virtual smartphone instance remains addressable by a phone number. A specialized portable interface device (such as a smartglasses device, a smartwatch, or an adapted smartphone device) remotely accesses the virtual smartphone instance through a cellular or internet connection and utilizes the smartphone applications to deploy smartphone services, including messaging and phone calling via the phone number. The systems, devices, and methods are extended to include a cellular telecommunications content delivery network comprising multiple portable interface devices all remotely accessing respective virtual smartphone instances corresponding to unique phone numbers, with virtual smartphone instances edge cached in relation to the portable interface devices.

14 Claims, 5 Drawing Sheets

(51) Int. Cl.
*G06F 9/451* (2018.01)
*H04M 1/72409* (2021.01)

(56) References Cited

U.S. PATENT DOCUMENTS

| | | | |
|---|---|---|---|
| 11,039,486 B2* | 6/2021 | Schopp | H04L 63/0428 |
| 11,100,511 B1* | 8/2021 | Rule | G06F 9/54 |
| 2010/0333088 A1* | 12/2010 | Rogel | G06F 9/45533 |
| | | | 718/1 |
| 2013/0321340 A1* | 12/2013 | Seo | G06F 3/04883 |
| | | | 345/174 |
| 2015/0341416 A1* | 11/2015 | Chung | H04W 4/60 |
| | | | 715/738 |
| 2016/0112875 A1* | 4/2016 | Kasravi | H04W 12/06 |
| | | | 455/411 |
| 2018/0113669 A1* | 4/2018 | Szeto | G06F 3/04815 |
| 2018/0167762 A1* | 6/2018 | Hatambeiki | H04L 67/04 |
| 2018/0206060 A1* | 7/2018 | Yazdani | H04L 67/10 |
| 2018/0218212 A1* | 8/2018 | Yoshikawa | G06V 40/67 |
| 2018/0342106 A1* | 11/2018 | Rosado | G06Q 10/109 |
| 2019/0371315 A1* | 12/2019 | Ewen | G10L 15/22 |
| 2020/0297206 A1* | 9/2020 | Zakharov | A61B 3/113 |
| 2021/0120101 A1* | 4/2021 | Alexander | H04M 1/72412 |
| 2021/0256495 A1* | 8/2021 | Chen | G06Q 20/341 |
| 2021/0282196 A1* | 9/2021 | Schopp | H04L 67/10 |
| 2021/0289069 A1* | 9/2021 | Moshir | G10L 15/30 |
| 2022/0086269 A1* | 3/2022 | Gao | H04M 1/2753 |
| 2022/0150687 A1* | 5/2022 | Özümüztoprak | H04W 12/06 |

\* cited by examiner

SYSTEMS, DEVICES, AND METHODS FOR REMOTE ACCESS SMARTPHONE SERVICES

BACKGROUND

Description of the Related Art

Smartphones and Smartphone Services

Smartphones are mobile phones with additional hardware and software to enable computing functionalities beyond making and receiving phone calls. Smartphone hardware typically includes sensors (such as cameras, accelerometers, magnetometers, proximity sensors, barometers, and/or gyroscopes), a touchscreen, and communications hardware (e.g., antennas, modems) to support wireless communications protocols (such as Bluetooth, Wi-Fi, LTE, 4G, 5G, satellite navigation, and/or others).

The smartphone hardware may be leveraged by the smartphone software to provide various smartphone services. Smartphone software typically includes a sophisticated mobile operating system that supports a wide range of smartphone services including, for example and without limitation, web browsing, messaging and email, multimedia functionality (including streaming music and streaming video), navigation functionality, games, weather reporting, a calculator, a calendar, and/or fitness tracking. While much of the operation of a smartphone relies on data retrieved via wireless communication with the internet and/or a mobile network, the majority of smartphone services (including those listed above) each typically require a dedicated software application or program (e.g., an "app") stored and executed locally on-board the smartphone itself.

Wearable Heads-Up Displays and Smartglasses

A wearable heads-up display is a head-mounted display that enables the user to see displayed content but does not prevent the user from being able to see their external environment. A wearable heads-up display is an electronic device that is worn on a user's head and, when so worn, secures at least one electronic display within the accessible field of view of at least one of the user's eyes, regardless of the position or orientation of the user's head, but this at least one display is either at least partially transparent and/or positioned at a periphery of the user's field of view so that the user is still able to see their external environment. Examples of wearable heads-up displays include: Focals® by North, Google Glass®, Microsoft HoloLens®, Magic Leap One, Vuzix Blade®, Optinvent Ora®, Epson Moverio®, and Sony Glasstron®, just to name a few. A wearable heads-up display may or may not employ a form factor that resembles that of conventional eyeglasses or sunglasses. A wearable heads-up display that does employ a form factor that resembles conventional eyeglasses or sunglasses is a form of smartglasses.

Smartglasses are eyeglasses or sunglasses with on-board electronics that enable additional functionality. Smartglasses that include a display capability (such as Focals® by North) are typically a form of wearable heads-up display, but not all smartglasses products employ a display capability. For example, Snap Spectacles are smartglasses with a front-facing camera and no display, and Bose Frames are smartglasses with audio speakers and no display. Most smartglasses devices available today rely on a communicative link (either tethered or wireless) to the user's smartphone in order to operate. For example, in order to provide mobile messaging functionality Google Glass®, Focals® by North, and Vuzix Blade® all communicate with mobile networks indirectly through a Bluetooth link to the user's smartphone.

BRIEF SUMMARY

A system for providing remote access smartphone services may be summarized as including: a host server comprising: at least one processor; a host communications interface communicatively coupled to the at least one processor of the host server; and at least one non-transitory processor-readable storage medium communicatively coupled to the at least one processor of the host server, the at least one non-transitory processor-readable storage medium storing: a first virtual smartphone instance addressable by a first phone number, the first virtual smartphone instance comprising: a first messaging application to receive messages sent to the first phone number and to send messages from the first phone number; and a first calling application to receive phone calls directed to the first phone number and to deliver phone calls from the first phone number; and processor-executable instructions that, when executed by at least one processor of the host server, cause the host communications interface of the host server to provide remote access to the first virtual smartphone instance; and a first portable interface device comprising: at least one processor; a device communications interface communicatively coupled to the at least one processor of the first portable interface device; and at least one non-transitory processor-readable storage medium communicatively coupled to the at least one processor of the first portable interface device, the at least one non-transitory processor-readable storage medium storing processor-executable instructions that, when executed by at least one processor of the first portable interface device, cause the device communications interface of the first portable interface device to access the first virtual smartphone instance. The first portable interface device may include a wearable heads-up display. The first portable interface device may include a smartglasses device. The first portable interface device may include a smartwatch. The device communications interface of the first portable interface device may include a wireless broadband transceiver operative to send and receive wireless signals through a cellular network.

The at least one non-transitory processor-readable storage medium of the host server may further store: a second virtual smartphone instance addressable by a second phone number, the second phone number different from the first number and the second virtual smartphone instance comprising: a second messaging application to receive messages sent to the second phone number and to send messages from the second phone number; and a second calling application to receive phone calls directed to the second phone number and to deliver phone calls from the second phone number; and processor-executable instructions that, when executed by at least one processor of the host server, cause the host communications interface of the host server to provide remote access to the second virtual smartphone instance. The system may further include: a second portable interface device comprising: at least one processor; a device communications interface communicatively coupled to the at least one processor of the second portable interface device; and at least one non-transitory processor-readable storage medium communicatively coupled to the at least one processor of the second portable interface device, the at least one non-transitory processor-readable storage medium storing processor-executable instructions that, when executed by at least one processor of the second portable interface device, cause the device communications interface of the second portable interface device to access the second virtual smartphone instance.

The at least one non-transitory processor-readable storage medium of the host server may further store: a plurality of additional virtual smartphone instances each addressable by a respective unique phone number, each respective additional virtual smartphone instance comprising: a respective messaging application to receive messages sent to a unique phone number by which the virtual smartphone instance is addressable and to send messages from the unique phone number by which the virtual smartphone instance is addressable; and a respective calling application to receive phone calls directed to the unique phone number by which the virtual smartphone instance is addressable and to deliver phone calls from the unique phone number by which the virtual smartphone instance is addressable; and processor-executable instructions that, when executed by at least one processor of the host server, cause the host communications interface of the host server to provide remote access to the plurality of additional virtual smartphone instances. The system may further include: a plurality of additional portable interface devices, each respective additional portable interface device comprising: at least one processor; a device communications interface communicatively coupled to the at least one processor of the additional portable interface device; and at least one non-transitory processor-readable storage medium communicatively coupled to the at least one processor of the additional portable interface device, the at least one non-transitory processor-readable storage medium storing processor-executable instructions that, when executed by at least one processor of the additional portable interface device, cause the device communications interface of the additional portable interface device to access a corresponding additional virtual smartphone instance.

The first virtual smartphone instance stored in the at least one non-transitory processor-readable storage medium of the host server may further include: at least one smartphone software application selected from a group consisting of: a web browser, a navigation application, a music streaming application, a video streaming application, a weather application, a calculator, an email application, a calendar, and a fitness tracker.

The processor-executable instructions stored in the at least one non-transitory processor-readable storage medium of the host server that, when executed by at least one processor of the host server, cause the host communications interface of the host server to provide remote access to the first virtual smartphone instance, may cause the host communications interface of the host server to provide remote access to the first virtual smartphone instance via a communications link between the host communications interface of the host server and the device communications interface of the first portable interface device. The processor-executable instructions stored in the at least one non-transitory processor-readable storage medium of the first portable interface device that, when executed by at least one processor of the first portable interface device, cause the device communications interface of the first portable interface device to access the first virtual smartphone instance, may cause the device communications interface of the first portable interface device to access the first virtual smartphone instance via a communications link between the device communications interface of the first portable interface device and the host communications interface of the host server.

The system may further include a content delivery network, wherein the host server corresponds to an edge server in the content delivery network.

A host server for providing remote access smartphone services to at least one portable interface device may be summarized as including: at least one processor; a host communications interface communicatively coupled to the at least one processor; and at least one non-transitory processor-readable storage medium communicatively coupled to the at least one processor, the at least one non-transitory processor-readable storage medium storing: a first virtual smartphone instance addressable by a first phone number, the first virtual smartphone instance comprising: a first messaging application to receive messages sent to the first phone number and to send messages from the first phone number; and a first calling application to receive phone calls directed to the first phone number and to deliver phone calls from the first phone number; and processor-executable instructions that, when executed by at least one processor, cause the host communications interface server to provide a first portable interface device with remote access to the first virtual smartphone instance. The at least one non-transitory processor-readable storage medium may further store: a second virtual smartphone instance addressable by a second phone number, the second phone number different from the first number and the second virtual smartphone instance comprising: a second messaging application to receive messages sent to the second phone number and to send messages from the second phone number; and a second calling application to receive phone calls directed to the second phone number and to deliver phone calls from the second phone number; and processor-executable instructions that, when executed by at least one processor, cause the host communications interface to provide a second portable interface device with remote access to the second virtual smartphone instance.

The at least one non-transitory processor-readable storage medium may further store: a plurality of additional virtual smartphone instances each addressable by a respective unique phone number, each respective additional virtual smartphone instance comprising: a respective messaging application to receive messages sent to a unique phone number by which the virtual smartphone instance is addressable and to send messages from the unique phone number by which the virtual smartphone instance is addressable; and a respective calling application to receive phone calls directed to the unique phone number by which the virtual smartphone instance is addressable and to deliver phone calls from the unique phone number by which the virtual smartphone instance is addressable; and processor-executable instructions that, when executed by at least one processor, cause the host communications interface to provide a plurality of additional portable interface devices with remote access to respective ones of the plurality of additional virtual smartphone instances.

The first virtual smartphone instance stored in the at least one non-transitory processor-readable storage medium may further include: at least one smartphone software application selected from a group consisting of: a web browser, a navigation application, a music streaming application, a video streaming application, a weather application, a calculator, an email application, a calendar, and a fitness tracker. The host server may correspond to an edge server in a content delivery network.

A portable interface device with remote access smartphone services may be summarized as including: at least one processor; a device communications interface communicatively coupled to the at least one processor; and at least one non-transitory processor-readable storage medium communicatively coupled to the at least one processor, the at least one non-transitory processor-readable storage medium storing processor-executable instructions that, when executed by at least one processor, cause the portable interface device to remotely access a virtual smartphone instance via the device communications interface. The portable interface device may include a wearable heads-up display, wherein the at least one processor, the device communications interface, and the at least one non-transitory processor-readable storage medium are all components of the wearable heads-up display. The portable interface device may include a smartglasses device, wherein the at least one processor, the device communications interface, and the at least one non-transitory processor-readable storage medium are all components of the smartglasses device. The portable interface device may include a smartwatch, wherein the at least one processor, the device communications interface, and the at least one non-transitory processor-readable storage medium are all components of the smartwatch. The device communications interface may include a wireless broadband transceiver operative to send and receive wireless signals through a cellular network.

The virtual smartphone instance may be stored on a remote host server and addressable by a phone number. The virtual smartphone instance may include: a messaging application to receive messages sent to the phone number and to send messages from the phone number; and a calling application to receive phone calls directed to the phone number and to deliver phone calls from the phone number. The virtual smartphone instance may further include: at least one smartphone software application selected from a group consisting of: a web browser, a navigation application, a music streaming application, a video streaming application, a weather application, a calculator, an email application, a calendar, and a fitness tracker.

A method of providing remote access smartphone services may be summarized as including: storing, at a host server, a virtual smartphone instance including a smartphone application; establishing a communications link between the host server and a portable interface device; accessing, by the portable interface device, the virtual smartphone instance through the communications link; and executing the smartphone application by the portable interface device. The host server may be part of a content delivery network, in which case storing, at the host server, the virtual smartphone instance may include edge caching the virtual smartphone instance in the content delivery network.

The virtual smartphone instance may be addressable by a phone number and the smartphone application may include a messaging application, in which case executing the smartphone application by the portable interface device may include at least one of: sending a message from the phone number by the portable interface device; and/or receiving a message at the phone number by the portable interface device.

The virtual smartphone instance may be addressable by a phone number and the smartphone application may include a phone calling application, in which case executing the smartphone application by the portable interface device may include engaging in a phone call at the phone number by the portable interface device.

Establishing a communications link between the host server and a portable interface device may include establishing a cellular link between the host server and the portable interface device, the cellular link mediated by at least one cellular antenna.

The method may further include: storing, at the host server, a second virtual smartphone instance including a smartphone application; establishing a communications link between the host server and a second portable interface device; accessing, by the second portable interface device, the second virtual smartphone instance through the communications link between the host server and the second portable interface device; and executing the smartphone application from the second virtual smartphone instance by the second portable interface device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
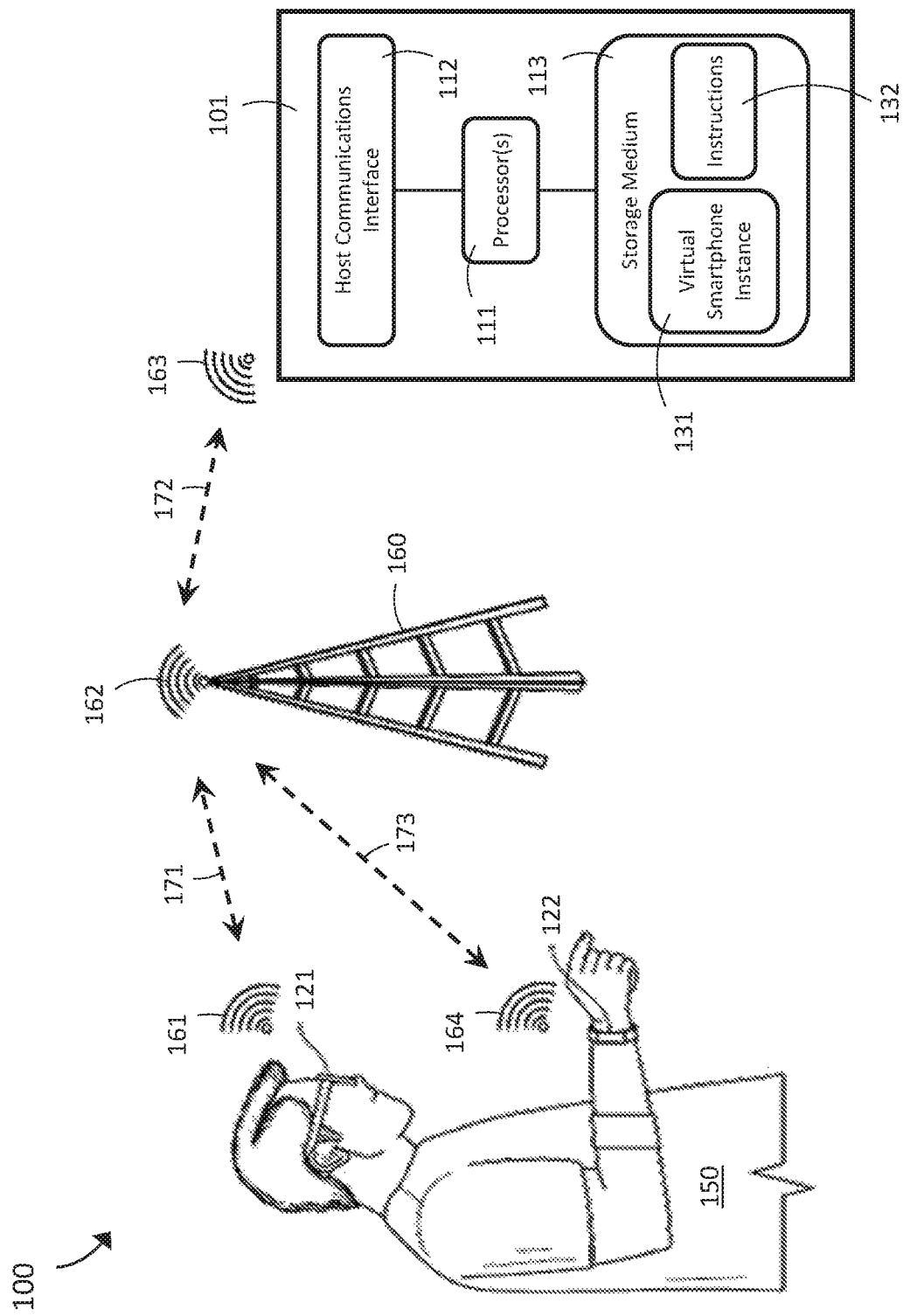
FIG. 1 is an illustrative diagram showing an implementation of a system for providing remote access smartphone services in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices, head-worn devices, displays or screens, projectors, and computers, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

As previously described, most smartglasses devices available today rely on a communicative link (either tethered or wireless) to the user's smartphone in order to operate. For example, in order to provide mobile messaging functionality Google Glass®, Focals® by North, and Vuzix Blade® all communicate with mobile networks indirectly through a Bluetooth link to the user's smartphone. That is, the smartglasses access smartphone services by communicating directly with a smartphone. This configuration has the advantage of giving the smartglasses a direct portal to the user's phone number and various smartphone services that make use of this phone number (e.g., phone calling, messaging), but this configuration also has numerous disadvantages. One disadvantage of this configuration is that it forces the user to carry two portable electronic devices (i.e., the smartglasses and the smartphone) wherever he/she wants to use the smartglasses, which fundamentally undermines the value of having heads-up, hands-free smartglasses. Another disadvantage of this configuration is that smartphone services employed or accessed by the smartglasses are necessarily tied to the smartphone mobile operating system with all of its limitations and constraints. A person of skill in the art will appreciate that some smartphone mobile operating systems are more accessible and configurable (i.e., more "open") than others, and those smartphone mobile operating systems that are less accessible and configurable (i.e., more "closed") can seriously restrict the performance and overall user experience of smartphone services employed or accessed through the smartphone by smartglasses. In particular, those smartphone services (such as phone calling and messaging) that make use of the user's phone number in cellular networks may perform sub-optimally when run by a closed mobile operating system and accessed by smartglasses. An extreme example of this is in the messaging services implemented by Focals® by North smartglasses. When Focals® by North are connected to an Android® smartphone (Android® being a well-known "open" mobile operating system), the Focals® by North messaging application may generally employ the user's phone number to send/receive messages through a Bluetooth connection to the user's smartphone. However, when Focals® by North are connected to an iPhone® running iOS (iOS being a well-known "closed" mobile operating system), the Focals® by North messaging application may not be able to employ the user's phone number to send/receive messages through the iPhone and, instead, the Focals® by North messaging application may create and use a new phone number for the user to send/receive messages through a Bluetooth connection to the user's smartphone. Such creates a sub-optimal messaging experience for the user, and in particular for recipients of messages sent by the user from the new (e.g., previously unknown) phone number.

A common design goal for portable interface devices (such as smartglasses and smartwatches) is to control and/or minimize the device form factor. To date, smartglasses and other portable interface devices (such as smartwatches) have relied on a communicative link to a user's smartphone because, among other things, moving all of the functionality of a smartphone directly into a smartglasses device (or smartwatch, for example) would require the addition of hardware and software that would undesirably enlarge the form factor of the device. For example, smartglasses with self-contained smartphone functionality would require added smartphone hardware and software (including a larger battery to power it all) and result in a less desirable form factor that was larger and bulkier than that of conventional eyeglasses/sunglasses.

The various embodiments described herein provide systems, devices, and methods that address the foregoing and other issues by introducing the concept of a "virtual smartphone instance." Throughout this specification and the appended claims, the term "virtual smartphone instance" is used to refer to a software (e.g., cloud-based) virtualization of a physical smartphone device. In some implementations, a virtual smartphone instance may comprise an instance of a mobile operating system together with a suite of mobile applications that support smartphone services, all stored in a non-transitory processor-readable storage medium of a computer system or computer network. In other words, a virtual smartphone instance may comprise smartphone software without smartphone hardware. A single computer system or computer network may store and provide access to a plurality of virtual smartphone instances. A virtual smartphone instance may be addressable by a phone number. In a plurality of virtual smartphone instances, each respective virtual smartphone instance may be addressable by a respective unique phone number.

In accordance with the present systems, devices, and methods, a portable interface device (such as smartglasses or a smartwatch) that conventionally accesses and/or provides functionality by interacting with a smartphone device through a short range (e.g., Bluetooth) connection may instead access and provide functionality by interacting with a virtual smartphone instance through an internet or cellular connection. In this way, virtual smartphone instances may be used to provide remote access smartphone services to portable interface devices.

Throughout this specification and the appended claims, the term "portable interface device" is generally used to refer to any portable electronic device that a user employs to interface with other electronic devices through the internet or a mobile cellular network. The resulting interface may provide user:user interactions in the case that the other electronic device is operated by another user, or the resulting interface may provide user:data interaction in the case that the other electronic device is a repository of information (e.g., news, weather, etc.). Smartglasses and smartwatches are non-limiting examples of portable interface devices.

FIG. 1 is an illustrative diagram showing an implementation of a system 100 for providing remote access smartphone services in accordance with the present systems, devices, and methods. System 100 includes host server 101 and two exemplary portable interface devices: smartglasses 121 and smartwatch 122. Host server 101 comprises processor(s) (i.e., at least one processor) 111, host communications interface 112 communicatively coupled to processor(s) 111, and non-transitory processor-readable storage medium 113 communicatively coupled to processor(s) 111. In accordance with the present systems, devices, and methods, storage medium 113 stores at least a first virtual smartphone instance 131 and processor-executable instructions 132 that, when executed by processor(s) 111, cause host communications interface 112 to provide remote access to first virtual smartphone instance 131. More details of the composition of first virtual smartphone instance 131 are described later on in relation to FIG. 3.

Host communications interface 112 may employ any number or combination of established communications hardware (including wired/tethered communications hardware such as an ethernet port and modem, and/or wireless communications hardware including a wireless transceiver to send/receive wireless signals) and communications software to send and receive communications signals using any number or combination of communications protocols. Exemplary communications protocols that may be employed by host communications interface 112 include, without limitation: Wi-Fi, Bluetooth, 4G, LTE, and 5G, among others.

Smartglasses 121 and smartwatch 122 are shown in FIG. 1 as illustrative examples of portable interface devices that may access first virtual smartphone instance 131 stored in storage medium 113 of host server 101 in order to utilize remote access smartphone services. Smartglasses 121 may or may not include a wearable heads-up display. In some implementations, a wearable heads-up display that is not a smartglasses device (i.e., a wearable heads-up display that does not have a form factor that at least approximates that of conventional eyeglasses or sunglasses and/or does not provide any conventional "glasses" function) may be used as a portable interface device in lieu of, or together with, smartglasses 121 and/or smartwatch 122. As will be discussed in more detail later on (e.g., in relation to FIG. 4), smartglasses 121 and smartwatch 122 each include a respective device communications interface (not illustrated in FIG. 1) to, among other things, remotely access first virtual smartphone instance 131 through communications (e.g., wireless, cellular communications) with host communications interface 112 of host server 101. To this end, the respective device communications interface of each of smartglasses 121 and smartwatch 122 may include a respective wireless broadband transceiver operative to send a receive wireless signals through a cellular network using, for example, 4G, LTE, 5G, or similar cellular technology.

In the implementation of system 100 illustrated in FIG. 1, communications between smartglasses 121 and host server 101 are wireless and mediated by a cellular communications tower 160. That is, wireless communication signals 161 and 162 are sent/received between smartglasses 121 and cellular communications antenna 160 through a first wireless communications link 171 and wireless communication signals 162 and 163 are sent/received between cellular communications tower 160 and host server 101 through a second wireless communications link 172. First wireless communications link 171 and second wireless communications link 172 together form a wireless communications link between smartglasses 121 and host server 101 that is mediated by cellular communications tower 160. Similarly, communications between smartwatch 122 and host server 101 are wireless and mediated by cellular communications tower 160. That is, wireless communication signals 164 and 162 are sent/received between smartwatch 122 and cellular communications antenna 160 through a third wireless communications link 173 and wireless communication signals 162 and 163 are sent/received between cellular communications tower 160 and host server 101 through second wireless communications link 172. Third wireless communications link 173 and second wireless communications link 172 together form a wireless communications link between smartwatch 122 and host server 101 that is mediated by cellular communications tower 160.

A person of skill in the art will appreciate that, in alternative implementations, any or all of communications links 171, 172, and/or 173 may employ a wired/tethered connection instead of a wireless connection.

In the illustrative implementation of system 100 shown in FIG. 1, a single user 150 is shown using two portable interface devices (smartglasses 121 and smartwatch 122) to access first virtual smartphone instance 131. In accordance with the present systems, devices, and methods, a virtual smartphone instance (such as first virtual smartphone instance 131) may be accessed to provide remote access smartphone services to any number and a wide variety of portable interface devices. Single user 150 may advantageously access the same first virtual smartphone instance 131 through smartglasses 121 and through smartwatch 122 in order to utilize the same remote access smartphone services through different portable interface devices, either concurrently or at different times. On a first day, user 150 may choose to wear smartglasses 121 and not smartwatch 122 and, on that first day, user 150 may access first virtual smartphone instance 131 to utilize remote access smartphone services through smartglasses 121. On a second day, user 150 may choose to wear smartwatch 122 and not smartglasses 121 and, on that second day, user 150 may access first virtual smartphone instance 131 to utilize the same remote access smartphone services through smartwatch 122. In accordance with the present systems, devices, and methods, the same user 150 may access the same virtual smartphone instance 131 in order to utilize the same remote access smartphone services through any number or combination of portable interface devices, including without limitation smartglasses 121, a smartwatch 122, a wearable heads-up display, a laptop, a tablet computer, a smart ring or armband, an automobile computer, and/or a wide range of other portable interface devices. In addition to affording the user 150 the convenience and versatility of accessing the same remote access smartphone services through a range of different devices, any of which may be preferred by user 150 at any given time depending on the context, the present systems, devices, and methods also allow the portable interface devices themselves to be designed with fewer hardware requirements and constraints. Portable interface devices such as smartglasses 121, smartwatch 122, and even smartphones themselves may be made smaller, lighter, and generally more "portable" by removing local hardware and software that conventionally enables smartphone services and instead utilizing remote access smartphone services in accordance with the present systems, devices, and methods.

FIG. 1 provides an illustrative example of a basic system 100 configured to provide remote access smartphone services to a single user 150 using any number of portable interface devices. In accordance with the present systems, devices, and methods, the basic elements of system 100 may be extended to provide remote access smartphone services to multiple different users.

Figure 2:
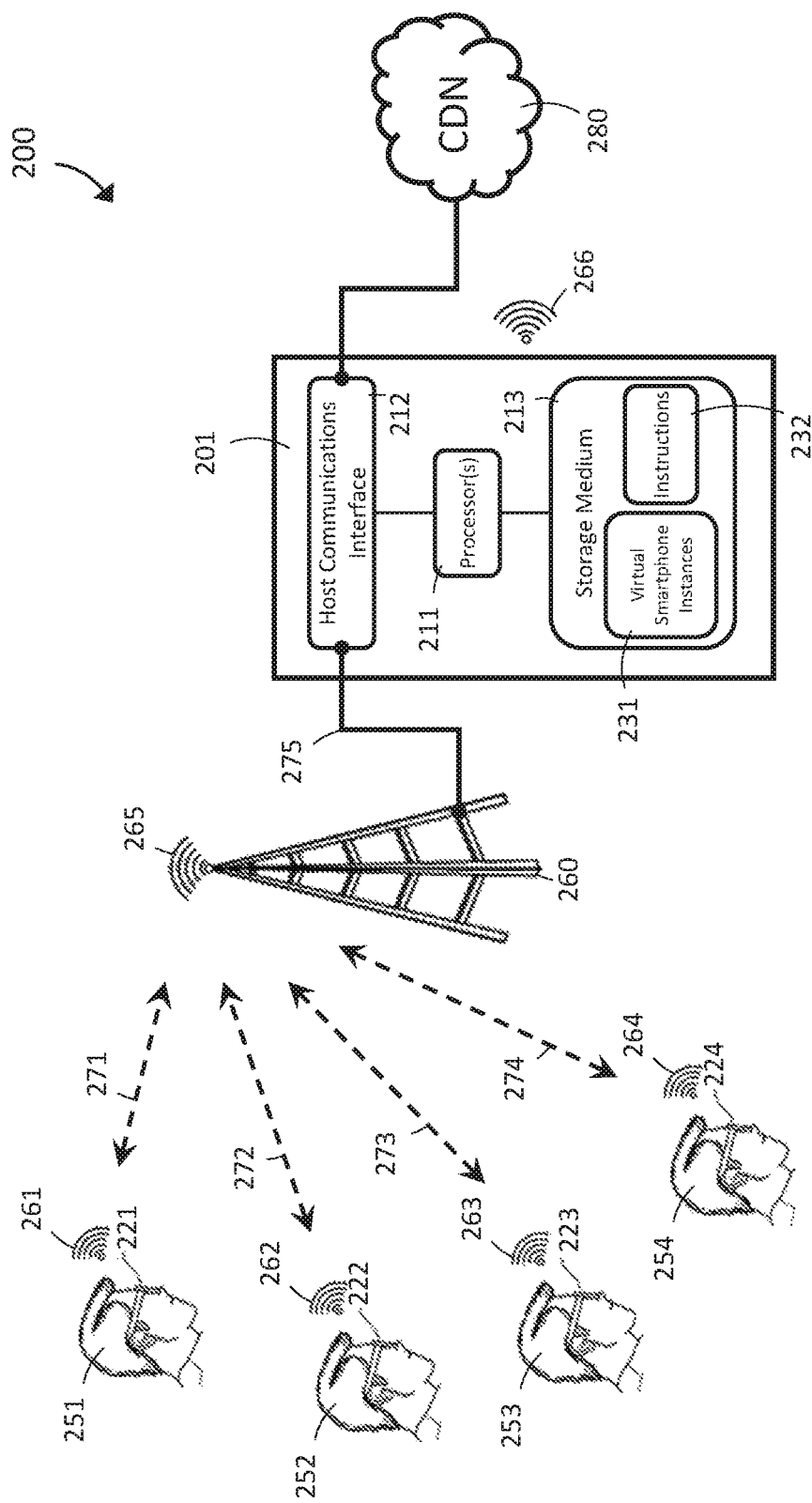
FIG. 2 is an illustrative diagram showing an implementation of a system for providing remote access smartphone services to multiple different users in accordance with the present systems, devices, and methods.

FIG. 2 is an illustrative diagram showing an implementation of a system 200 for providing remote access smartphone services to multiple different users in accordance with the present systems, devices, and methods. System 200 includes host server 201 and a plurality of exemplary portable interface devices each operated by a different respective user: smartglasses 221 operated by user 251, smartglasses 222 operated by user 252, smartglasses 223 operated by user 253, and smartglasses 224 operated by user 254. Similar to host server 101 from system 100, host server 201 comprises processor(s) (i.e., at least one processor) 211 (similar to processor(s) 111 from system 100), host communications interface 212 (similar to host communications interface 112 from system 100) communicatively coupled to processor(s) 211, and non-transitory processor-readable storage medium 213 (similar to storage medium 113 form system 100) communicatively coupled to processor(s) 211. In accordance with the present systems, devices, and methods, storage medium 213 stores multiple virtual smartphone instances 231 and processor-executable instructions 232 that, when executed by processor(s) 211, cause host communications interface 212 to provide remote access to the multiple virtual smartphone instances 231. More details of the composition of virtual smartphone instances 231 are described later on in relation to FIG. 3.

In the illustrative implementation of system 200 shown in FIG. 2, multiple users 251, 252, 253, and 254 are shown each using a respective smartglasses device 221, 222, 223, and 224 to access a respective one of multiple virtual smartphone instances 231 stored in storage medium 213 of host server 201. Each of smartglasses 221, 222, 223, and 224 includes a respective device communications interface (not shown in FIG. 2) that communicates wirelessly with, for example, a cellular antenna tower 260 using a cellular communications protocol such as 4G, LTE, 5G, or similar. Specifically, first smartglasses 221 send wireless signals 261 to cellular antenna tower 260 and receive wireless signals 265 from cellular antenna tower 260 through first wireless communications link 271, second smartglasses 222 send wireless signals 262 to cellular antenna tower 260 and receive wireless signals 265 from cellular antenna tower 260 through second wireless communications link 272, third smartglasses 223 send wireless signals 263 to cellular antenna tower 260 and receive wireless signals 265 from cellular antenna tower 260 through third wireless communications link 273, and fourth smartglasses 224 send wireless signals 264 to cellular antenna tower 260 and receive wireless signals 265 from cellular antenna tower 260 through fourth wireless communications link 274. A person of skill in the art will appreciate that this architecture may be extended to include any number of smartglasses or other portable interface devices using any number of wireless communications links with any number of cellular antenna towers.

Cellular antenna tower 260 is communicatively coupled with host communications interface 212 of host server 201. In the illustrated implementation of system 200, cellular antenna tower 260 is tethered to host communications interface 212 of host server 201 by a wire connection 275. For example, host server 201 may be physically located proximate cellular antenna tower 260 and even physically on-site at cellular antenna tower 260. Proximity between host server 201 and cellular antenna tower 260 may be advantageous in applications where it is desired to reduce/minimize latency of remote access smartphone services utilized by smartglasses 221, 222, 223, and 224 through virtual smartphone instances 231. For example, in some implementations host server 201 may be part of (i.e., communicatively coupled to) a set or network of communicatively coupled computer systems or servers, such as a "content delivery network" or "content distribution network" (CDN) 280. Host server 201 may be communicatively coupled to CDN 280 by a wired connection 276 or by a wireless communicative link (not illustrated in FIG. 2) that may send/receive wireless signals through cellular antenna tower 260 or directly, such as signals 266, at host communications interface 212. In implementations where host server 201 is part of a CDN 280, the latency of remote access smartphone services accessed by smartglasses 221, 222, 223, and 224 may be reduced/minimized if host server 201 is an edge server in CDN 280 such that virtual smartphone instances 231 are edge cached (in some implementations, mirror edge cached) in CDN 280.

As a specific example, users 251, 252, 253, and 254 may all live and/or work in close proximity to cellular antenna tower 260 such that the majority of their smartphone cellular communications are routed through cellular antenna tower 260. In this case, the particular virtual smartphone instances 231 accessed by smartglasses 221, 222, 223, and 224 may advantageously be stored in the storage medium 213 of a host server 201 that is configured (i.e., positioned, located, coupled, or otherwise engaged) at an edge of CDN 280 that is close or closest to cellular antenna tower 260. If any of users 251, 252, 253, and/or 254 travels away from cellular antenna tower 260 and ends up in closer proximity to a second cellular antenna tower that is part of CDN 280, then a copy (either the sole copy or a duplicate copy) of the virtual smartphone instance 231 accessed by their smartglasses 221, 222, 223, 224 may become stored at a new host server corresponding to an edge that is close or closest to the second cellular antenna tower through which their cellular communications are routed.

Throughout this specification and the appended claims, the term "host server" is used in a general sense to refer to a computer system (or, in some implementation, a distributed computing system) that stores and provides access to (i.e., "hosts") one or more virtual smartphone instance(s) utilized by one or more other device(s). Unless the specific context requires otherwise, the term "host server" is not intended to impart any other features or limitations, for example features or limitations corresponding to specific hardware or specific roles/functions in a computer network and/or telecommunications network. Depending on the specific context, as used herein the term host server may include: a host computer, a personal computer, an edge server, an edge computer, a database server, an application server, and the like. The term "host server" should be construed as it is used in context throughout this specification and not necessarily as it might be used in other contexts outside of the scope of this specification.

Figure 3:
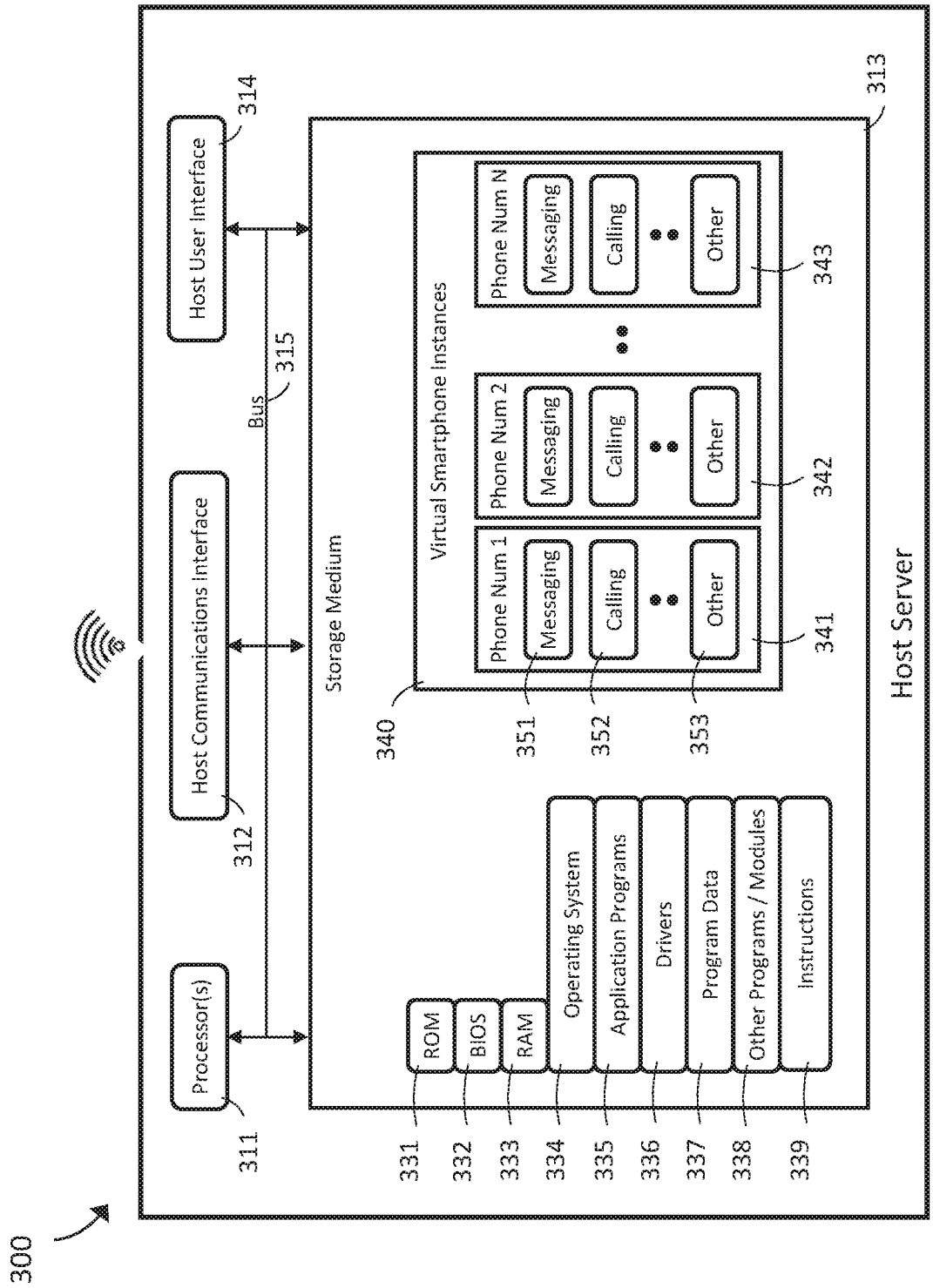
FIG. 3 is an illustrative diagram of an exemplary host server for providing remote access smartphone services in accordance with the present systems, devices, and methods.

FIG. 3 is an illustrative diagram of an exemplary host server 300 for providing remote access smartphone services in accordance with the present systems, devices, and methods. Exemplary host server 300 is suitable at a high level for use as host server 101 in system 100 or host server 201 in system 200. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices such as smartglasses, multiprocessor systems, microprocessor-based or programmable consumer electronics, personal computers ("PCs"), network PCs, minicomputers, mainframe computers, and the like. Host server 300 will at times be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, and 68xxx series microprocessors from Motorola Corporation.

Host server 300 includes at least one processor (i.e., one or more processor(s)) 311, a host communications interface 312, a non-transitory processor-readable storage medium 313, and a host user interface 314, all of which may be communicatively coupled together in various configurations via, for example, system bus 315.

The processor(s) 311 in host server 300 may be any logic processing unit, such as one or more central processing units (CPUs), microprocessors, digital signal processors (DSPs), application-specific integrated circuits (ASICs), field programmable gate arrays (FPGAs), and the like. Unless described otherwise, the construction and operation of the various blocks shown in FIG. 3 are of conventional design. As a result, such blocks need not be described in further detail herein, as they will be understood by those skilled in the relevant art.

The host communications interface 312 of host server 300 may be substantially similar to host communications interface 112 of host server 101 and/or host communications interface 212 of host server 201. Host communications interface 312 may include one or more network, wired, or wireless communications interfaces (e.g., network interface controllers, cellular radios, Wi-Fi radios, Bluetooth radios, and/or the like) for establishing communications over a network, for instance, the Internet and/or a cellular network. Host server 300 operates in a networked environment using, via host communications interface 312, one or more of the logical connections to communicate with one or more remote computers, servers and/or devices via one or more communications channels. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks. In a networked environment, program modules, application programs, or data, or portions thereof, can be stored in a separate server computing system (not shown).

The host user interface 314 of host server 300 may include input mechanisms to enable a user of host server 300 to enter commands and information, such as for example, a touch screen, stylus, a computer mouse, trackball, keyboard, and/or eye tracker. Other input devices can include a microphone, joystick, game pad, tablet, scanner, biometric scanning device, wearable input device, and the like. These and other input devices may be connected to the processor(s) 311 through an interface such as a touch-screen controller and/or a universal serial bus ("USB") interface that couples user input to the system bus 315, although other interfaces such as a parallel port, a game port or a wireless interface or a serial port may be used. Host user interface 314 also may include output mechanisms to enable a user of host server 300 to receive commands and information, such as for example, a display screen, speakers, haptic actuator or haptic engine, and the like.

The system bus 315 in host server 300 can employ any known bus structures or architectures, including a memory bus with memory controller, a peripheral bus, and a local bus. For convenience, processor(s) 311, host communications interface 312, storage medium 313, and host user interface 314 are illustrated as communicably coupled to each other via the system bus 315, thereby providing connectivity between the above-described components. In alternative implementations, the above-described components may be communicably coupled in a different manner than illustrated in FIG. 3. For example, one or more of the above-described components may be directly coupled to other components, or may be coupled to each other, via intermediary components (not shown). In some implementations, system bus 315 may be omitted and the components may be coupled directly to each other using suitable connections.

Non-transitory processor-readable storage medium 313 includes read-only memory ("ROM") 331 and random access memory ("RAM") 333. A basic input/output system ("BIOS") 332, which can form part of the ROM 331, contains basic routines that help transfer information between elements within host server 300, such as during start-up. Some implementations may employ separate buses for data, instructions and power.

Storage medium 313 may include one or more solid state memories, for instance, a Flash memory or solid state drive (SSD), which provides nonvolatile storage of processor-executable instructions, data structures, program modules and other data for host server 300. Although not depicted, host server 300 can employ other non-transitory computer- or processor-readable media, for example, a hard disk drive, an optical disk drive, or a memory card media drive.

Program modules can be stored storage medium 313, such as an operating system 334, one or more application programs 335, drivers 336, program data 337, and other programs or modules 338, including for example communications programs such as a server and/or a Web client or browser for permitting host server 300 to access and exchange data with other systems such as user computing systems, Web sites on the Internet, corporate intranets, or other networks. A communications program may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 3 as being stored in the storage medium 313, operating system 334, application programs 335, drivers 336, program data 337, and other programs/modules 338 can be stored on any other of a large variety of non-transitory processor-readable media (e.g., hard disk drive, optical disk drive, SSD and/or flash memory).

In accordance with the present systems, devices, and methods, storage medium 313 also stores virtual smartphones instances 340 and processor-executable instructions 339 that, when executed by processor(s) 311, cause host communications interface 312 to provide remote access to the virtual smartphone instances 340.

Virtual smartphone instances 340 include a first virtual smartphone instance 341, a second virtual smartphone instance 342, and additional virtual smartphone instances up to and including an $N^{th}$ virtual smartphone instance 343, where N is an integer greater than or equal to 1. Each respective virtual smartphone instance in virtual smartphone instances 340 is addressable by (i.e., corresponds to and, in some implementations, sends/receives messages and/or phone calls via) a respective unique phone number. That is, first virtual smartphone instance 341 is addressable by a first phone number (Phone Num 1 in FIG. 3), second virtual smartphone instance 342 is addressable by a second phone number (Phone Num 2 in FIG. 3) that is different from the first phone number, and each additional virtual smartphone instance up to and including $N^{th}$ virtual smartphone instance 343 (which is addressable by an $N^{th}$ phone number Phone Num N) is addressable by a respective unique phone number.

Each respective one of virtual smartphone instances 340 includes a respective suite of applications for providing smartphone services. Any particular one of virtual smartphone instances 340 may include any particular set or combination of smartphone applications to provide any particular set or combination of smartphone services; however, in general, each respective one of virtual smartphone instances 340 includes at least a messaging application (or a messaging functionality) and a calling application (or a calling functionality). In some implementations, messaging functionality and calling functionality may be combined in a single application, and in some implementations a messaging application and/or a calling application may also provide additional functionality.

Specifically, first virtual smartphone instance 341 includes a first messaging application 351 to receive messages sent to the first phone number (Phone Num 1) and to send messages from the first phone number (Phone Num 1). First messaging application 351 may employ known messaging services such as short message service (SMS), multimedia messaging service (MMS), and/or other instant messaging technology such as that employed by Google Hangouts, iMessage, Facebook Messenger, WhatsApp, Snapchat, and the like. First virtual smartphone instance 341 also includes a first calling application 352 to receive phone calls directed to the first phone number (Phone Num 1) and to deliver phone calls from the first phone number (Phone Num 1). First calling application 352 may employ known phone calling technologies such as conventional telephony services and/or voice over internet protocol (VoIP) technology. In addition to first messaging application 351 and first calling application 352, first virtual smartphone instance 341 may also include any number of additional "other" applications 353, including without limitation: a web browser, a navigation application, a music streaming application, a video streaming application, a weather application, a calculator, an email application, a calendar, and/or a fitness tracker. In accordance with the present systems, devices, and methods, first virtual smartphone instance 341 may be accessed by a first portable interface device (or, more generally, any portable interface device in a first set of portable interface devices associated with the first phone number Phone Num 1), such as smartglasses 121 and/or smartwatch 122, in order to provide remote access smartphone services to such first portable interface device(s).

As illustrated in FIG. 3, second virtual smartphone instance 342 and $N^{th}$ virtual smartphone instance 343 also each include a respective messaging application, and respective calling application, and a respective set or suite of additional "other" applications—none of which are called out in FIG. 3 to reduce clutter. In detail, second virtual smartphone instance 342 includes: a second messaging application to receive messages sent to the second phone number (Phone Num 2) and to send messages from the second phone number (Phone Num 2); a second calling application to receive phone calls directed to the second phone number (Phone Num 2) and to deliver phone calls from the second phone number (Phone Num 2); and a second set or suite of any number of "other" applications corresponding to other smartphone services. Likewise, $N^{th}$ virtual smartphone instance 343 includes: an $N^{th}$ messaging application to receive messages sent to the $N^{th}$ phone number (Phone Num N) and to send messages from the $N^{th}$ phone number (Phone Num N); an $N^{th}$ calling application to receive phone calls directed to the $N^{th}$ phone number (Phone Num N) and to deliver phone calls from the $N^{th}$ phone number (Phone Num N); and an $N^{th}$ set or suite of any number of "other" applications corresponding to other smartphone services Processor-executable instructions 339, when executed by processor(s) 311, cause host communications interface 312 to provide at least a first portable interface device with remote access to first virtual smartphone instance 341, at least a second portable interface device with remote access to second virtual smartphone instance 342, and at least an $N^{th}$ portable interface device with remote access to $N^{th}$ virtual smartphone instance 343. In this context, "to provide a portable interface device with remote access to a virtual smartphone instance" means to establish a communicative link (or communications link) between the portable interface device and the virtual smartphone instance such that the portable interface device can access, employ, execute, deploy, and/or engage smartphone services stored, embodied, contained, or otherwise made available by the virtual smartphone instance as if the virtual smartphone instance were stored, embodied, contained, or otherwise made available by the portable interface device itself.

Various examples of portable interface devices have been described throughout this specification, including smartglasses, smartwatches, and tablet computers. In accordance with the present systems, devices, and methods, smartphone devices themselves may be adapted to serve as portable interface devices as described herein. A smartphone device may be adapted to serve as a portable interface device described herein by, for example, moving certain smartphone software (such as applications providing smartphone services and, in some implementations, even the mobile operating system itself) off of the local smartphone hardware and into a virtual smartphone instance hosted "in the cloud" by, for example, a host server as described herein. Such an adapted smartphone may functionally operate, from the user's perspective, in a substantially similar way to a conventional smartphone device but may enjoy a reduced form factor or other benefits (such as, in some implementations, longer battery life) enabled by the reduced on-board processing and storage demands.

While the present systems, devices, and methods are applicable (and in many implementations, advantageous) using a wide range of different portable interface devices, the present systems, devices, and methods are particularly advantageous using wearable electronic devices such as smartglasses and smartwatches, where the current need to communicate through (and therefore for the user to also carry) a smartphone is particularly cumbersome.

Figure 4:
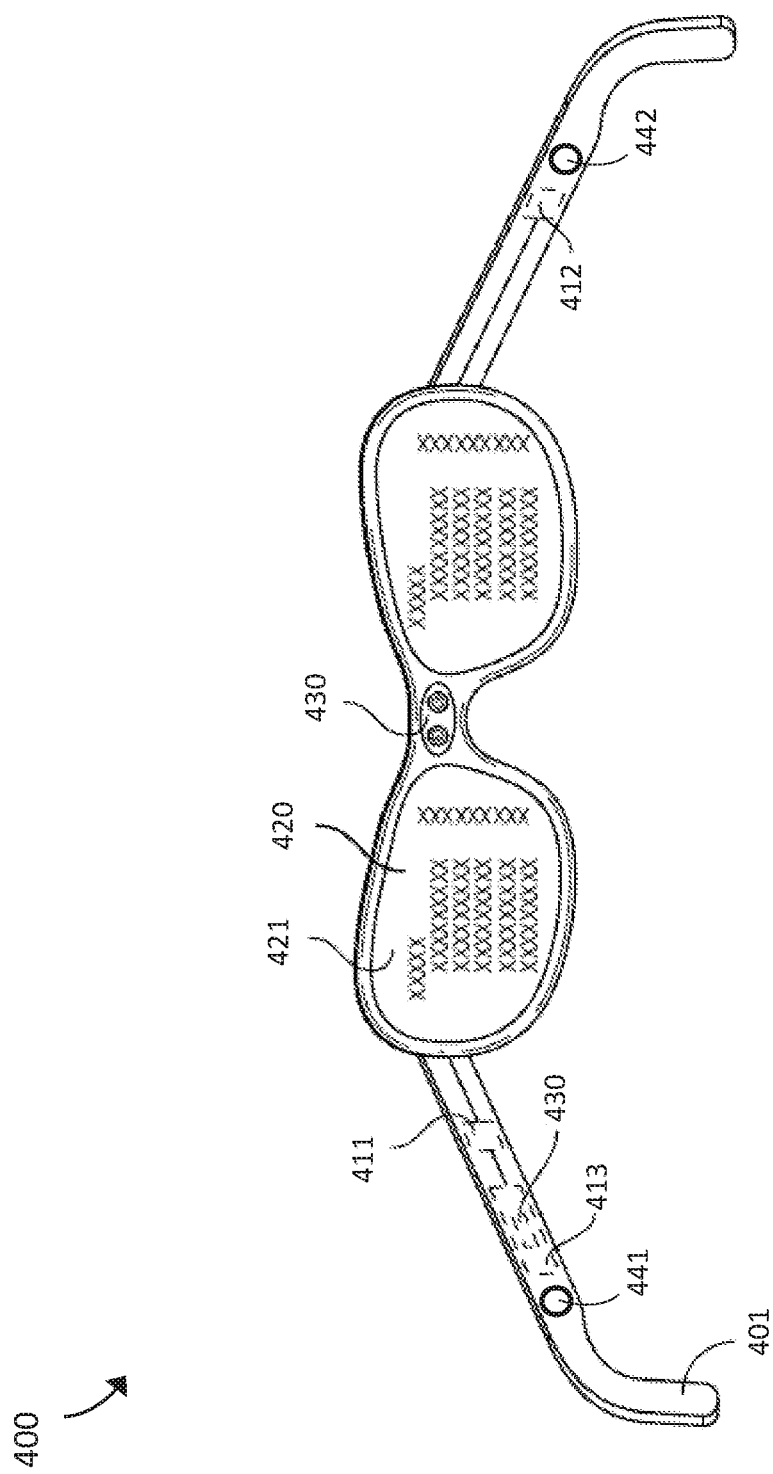
FIG. 4 is a schematic diagram of an exemplary smartglasses device that may be employed as a portable interface device in accordance with the present systems, devices, and methods.

FIG. 4 is a schematic diagram of an exemplary smartglasses device 400 that may be employed as a portable interface device in accordance with the present systems, devices, and methods. Smartglasses device 400 includes a support frame 401 that is sized and dimensioned to embody a form factor that at least approximates that of conventional eyeglasses or sunglasses. Support frame 401 carries, among other things, at least one processor 411, a device communications interface 412 communicatively coupled to processor(s) 411, and at least one non-transitory processor-readable storage medium 413 communicatively coupled to processor(s) 411. In accordance with the present systems, devices, and methods, storage medium 413 stores processor-executable instructions 430 that, when executed by processor(s) 411, cause device communications interface 412 to remotely access a virtual smartphone instance. As an example, processor-executable instructions 430, when executed by processor(s) 411, may cause device communications interface 412 to remotely access a virtual smartphone instance (e.g., 131) stored in a non-transitory processor-readable storage medium (e.g., 113) of a host server (e.g., 101) through a wireless communications (e.g., cellular) link (e.g., 171 and 172) with a host communications interface (e.g., 112) of the host server (e.g., 101).

Support frame 401 further carries at least one display 420 to provide display content 421 visible to a user of smartglasses device 400. Display content 421 may specifically relate to any of various smartphone services remotely accessed by smartphone device 400, including without limitation: display content related to messaging, display content related to phone calling, display content related to web browsing, display content related to navigation, display content related to music streaming, display content related to video streaming, display content related to the weather, display content related to a calculator, display content related to email, display content related to a calendar, and/or display content related to fitness tracking, just to name a few examples. Display 420 may employ any of a variety of different smartglasses display technologies, including without limitation those described in U.S. Pat. Nos. 9,989,764; 9,958,682; 10,191,283; US Patent Application Publication 2018-0292659; and/or U.S. Provisional Patent Application Ser. No. 62/791,514, each of which is incorporated herein by reference in its entirety.

Device communications interface 412 may include a wireless broadband transceiver operative to send and receive wireless signals through a cellular network, such as 4G, LTE, 5G, or similar.

Support frame 401 carries an eyetracker 430 to enable a user to interact with display content 421 and thereby control smartphone services remotely accessed by smartglasses device 400. In some implementations, smartglasses device 400 may be in communication with another input device (not shown), such as an electronic ring or armband, that may be used either in lieu of or in addition to eyetracker 430 to interact with display content 421 and control remote access smartphone services. Eyetracker 430 may employ any of a variety of eyetracking technologies, including without limitation those described in U.S. Pat. Nos. 10,078,219; 9,904,051; 10,409,057; and/or U.S. Provisional Patent Application Ser. No. 62/754,307, each of which is incorporated by reference herein in its entirety.

Support frame 401 also carries at least one speaker 441 and at least one microphone 442, which together enable a user of smartglasses device 400 to transmit his/her voice and to hear transmitted voices during phone calls, such phone calls being made using the phone number associated with the virtual smartphone instance through which smartglasses device 400 accesses remote smartphone services.

Some implementations of the present systems, devices, and methods include multiple portable interface devices and multiple virtual smartphone instances, with each portable interface device each mapped to a respective virtual smartphone instance. A further advantage of the present systems, devices, and methods is that, in scenarios involving multiple portable interface devices accessing multiple virtual smartphone instances, each virtual smartphone instance may employ a same or similar mobile operating system that is agnostic to the hardware and/or brand of the portable interface device(s) that are accessing it. In other words, a single mobile operating system may be used as a platform upon which all virtual smartphone instances are based, and then all portable interface devices (regardless of brand or hardware configuration, and regardless of whether the device is smartglasses, a smartwatch, a tablet computer, an adapted smartphone, or the like) in the system may remotely access smartphone services built upon such platform. Such ensures a uniformity and reliability of experience for all users and can, for example, remove the onus from the user to manage such things as software updates, security patches, and the like. Furthermore, if the mobile operating system employed is an existing mobile operating system, such as Android or iOS, then all smartphone applications that already exist for such platform(s) may be readily deployed in virtual smartphone instances remotely accessed by portable interface devices without necessitating that the makers of such portable interface devices design and develop new applications for their own respective platform(s).

The scope of the various implementations described herein includes the host server (e.g., the host-side), the portable interface device (e.g., the client-side), the complete host-client system, and further the methods of providing, accessing, and utilizing remote access smartphone services described herein.

Figure 5:
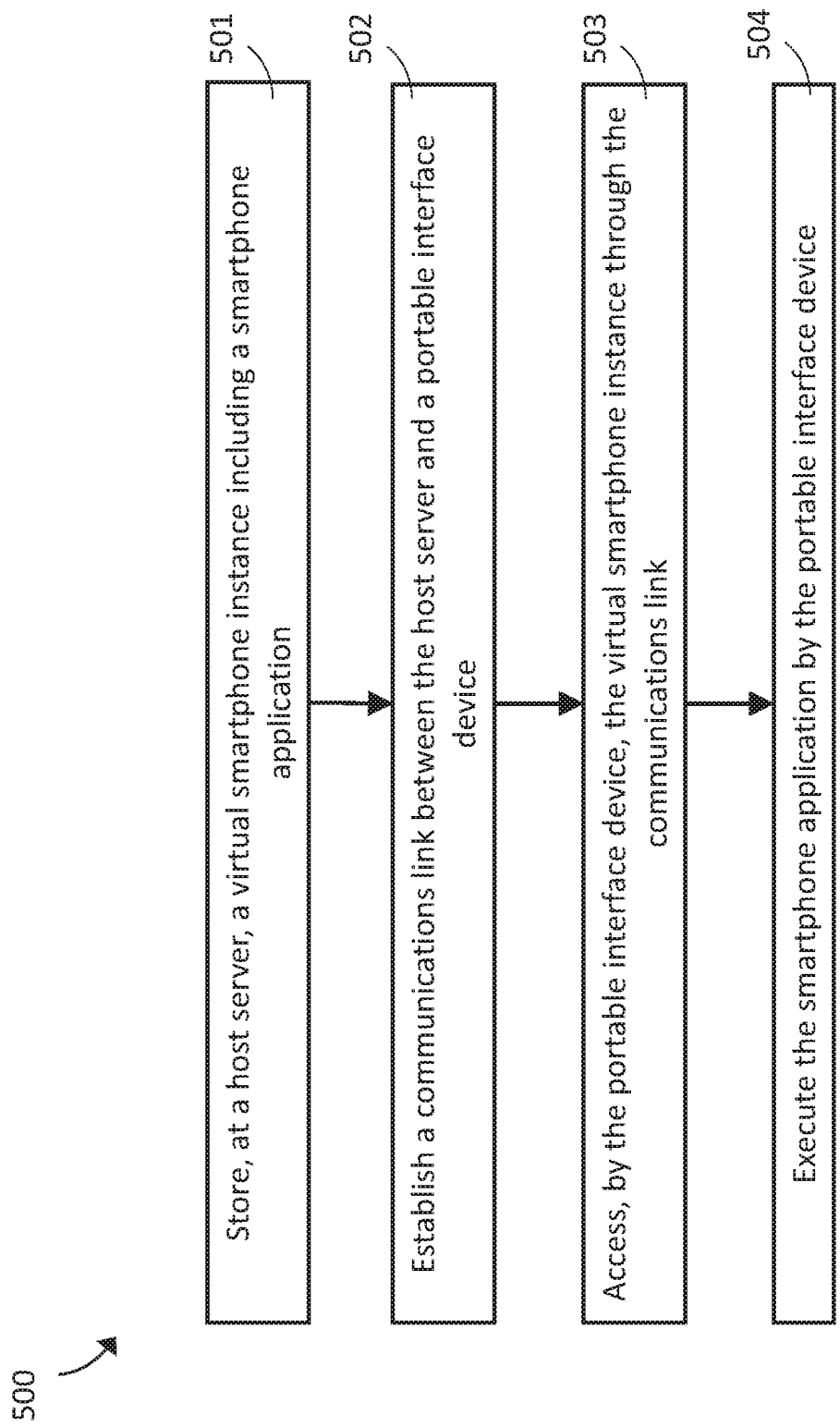
FIG. 5 is a flow-diagram showing a method of providing remote access smartphone services in accordance with the present systems, devices, and methods.

FIG. 5 is a flow-diagram showing a method 500 of providing remote access smartphone services in accordance with the present systems, devices, and methods. Method 500 includes four acts 501, 502, 503, and 504, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments, and in some implementations various acts may be performed concurrently. Method 500 may be carried out or performed by a system similar to system 100 from FIG. 1 and/or system 200 from FIG. 2.

At 501, at virtual smartphone instance including at least one smartphone application is stored at a host server. As previously described, the host server may be part of a CDN, in which case the storing at 501 may include edge caching the virtual smartphone instance in the CDN.

At 502, a communications link is established between the host server and a portable interface device (e.g., a smartglasses device, a smartwatch, or an adapted smartphone). As previously described, cellular telecommunications technology may be employed, in which case establishing the communications link at 502 may include establishing a cellular link between the host server and the portable interface device, with the cellular link mediated by at least one cellular antenna.

At 503, the portable interface device accesses (e.g., remotely accesses) the virtual smartphone instance stored at the host server at 501 through the communications link to the host server established at 502.

At 504, the portable interface device executes the smartphone application accessed at 503. As previously described, the virtual smartphone instance may be addressable by a phone number and the smartphone application may include, for example, a messaging application and/or a phone calling application. When the smartphone application includes a messaging application, executing the smartphone application by the portable interface device at 504 may include sending a message from the phone number by the portable interface device and/or receiving a message at the phone number by the portable interface device. When the smartphone application includes a phone calling application, executing the smartphone application by the portable interface device at 504 may include engaging in a phone call at the phone number by the portable interface device (e.g., making a phone call from the phone number by the portable interface device, receiving a phone call at the phone number by the portable interface device, and/or otherwise participating in a phone call at the phone number by the portable interface device).

As described previously, the present systems, devices, and methods may be extended to include providing remote access smartphone services to any number of portable interface devices. For example, method 500 may be extended so that: the host server stores a second virtual smartphone instance including a smartphone application; a communications link is established between the host server and a second portable interface device; the second portable interface device accesses the second virtual smartphone instance through the communications link between the host server and the second portable interface device; and the second portable interface device (remotely) executes the smartphone application from the second virtual smartphone instance.

Throughout this specification and the appended claims the term "communicative" as in "communicative coupling" and in variants such as "communicatively coupled," is generally used to refer to any engineered arrangement for transferring and/or exchanging information. Exemplary communicative couplings include, but are not limited to, electrically conductive pathways (e.g., electrically conductive wires, electrically conductive traces), magnetic pathways (e.g., magnetic media), optical pathways (e.g., optical fiber), wireless couplings, radio-frequency couplings, cellular couplings, broadband couplings, and the like.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other visual displays, not necessarily the exemplary visual displays generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for providing remote access smartphone services, the system comprising:
   a first portable interface device comprising:
      at least one processor;
      a device communications interface communicatively coupled to the at least one processor of the first portable interface device; and
      at least one non-transitory processor-readable storage medium communicatively coupled to the at least one processor of the first portable interface device, the at least one non-transitory processor-readable storage medium storing processor-executable instructions that, when executed by at least one processor of the first portable interface device, cause the device communications interface of the first portable interface device to:
    connect to a host server storing a plurality of virtual smartphone instances each addressable by a respective unique phone number, each respective virtual smartphone instance comprising:
        a respective messaging application to receive messages sent to a unique phone number by which the virtual smartphone instance is addressable and to send messages from the unique phone number by which the virtual smartphone instance is addressable; and
        a respective calling application to receive phone calls directed to the unique phone number by which the virtual smartphone instance is addressable and to deliver phone calls from the unique phone number by which the virtual smartphone instance is addressable; and
    access a virtual smartphone instance of the plurality of virtual smartphone instances to allow the first portable interface device to execute a smartphone application of the virtual smartphone instance; and
    a wearable heads-up display including an eye tracker configured to control the virtual smartphone instance.

2. The system of claim 1 wherein the first portable interface device includes a smartglasses device.

3. The system of claim 1 wherein the first portable interface device includes a smartwatch.

4. The system of claim 1 wherein the device communications interface of the first portable interface device includes a wireless broadband transceiver operative to send and receive wireless signals through a cellular network.

5. The system of claim 1 wherein the smartphone application comprises:
    at least one selected from a group consisting of: a web browser, a navigation application, a music streaming application, a video streaming application, a weather application, a calculator, an email application, a calendar, and a fitness tracker.

6. The system of claim 1 wherein:
the at least one non-transitory processor-readable storage medium stores processor-executable instructions that, when executed by at least one processor of the first portable interface device, cause the device communications interface of the first portable interface device to access the virtual smartphone instance of the plurality of virtual smartphone instances via a communications link between the device communications interface of the first portable interface device and a host communications interface of the host server.

7. A host server for providing remote access smartphone services to at least one portable interface device, the host server comprising:
    at least one processor;
    a host communications interface communicatively coupled to the at least one processor; and
    at least one non-transitory processor-readable storage medium communicatively coupled to the at least one processor, the at least one non-transitory processor-readable storage medium storing:
        plurality of virtual smartphone instances each addressable by a respective unique phone number, each respective virtual smartphone instance comprising:
            a respective messaging application to receive messages sent to a unique phone number by which the virtual smartphone instance is addressable and to send messages from the unique phone number by which the virtual smartphone instance is addressable; and
            a respective calling application to receive phone calls directed to the unique phone number by which the virtual smartphone instance is addressable and to deliver phone calls from the unique phone number by which the virtual smartphone instance is addressable; and
        processor-executable instructions that, when executed by at least one processor, cause the host communications interface to provide a plurality of portable interface device devices with remote access to respective ones of the plurality of virtual smartphone instances, wherein at least one portable interface device of the plurality of portable interface devices includes a wearable heads-up display including an eye tracker configured to control the virtual smartphone instance.

8. The host server of claim 7 wherein at least one virtual smartphone instance of the plurality of virtual smartphone instances stored in the at least one non-transitory processor-readable storage medium further comprises:
    at least one smartphone software application selected from a group consisting of: a web browser, a navigation application, a music streaming application, a video streaming application, a weather application, a calculator, an email application, a calendar, and a fitness tracker.

9. The host server of claim 7 wherein the host server corresponds to an edge server in a content delivery network.

10. A method of providing remote access smartphone services, the method comprising:
    storing, at a host server, a plurality of virtual smartphone instances each addressable by a respective unique phone number, each respective additional virtual smartphone instance including:
        a respective messaging application to receive messages sent to a unique phone number by which the virtual smartphone instance is addressable and to send messages from the unique phone number by which the virtual smartphone instance is addressable; and
        a respective calling application to receive phone calls directed to the unique phone number by which the virtual smartphone instance is addressable and to deliver phone calls from the unique phone number by which the virtual smartphone instance is addressable;
    establishing a communications link between the host server and a portable interface device; and
    providing the portable interface device access to a virtual smartphone instance of the plurality of virtual smartphone instances through the communications link to allow the portable interface device to execute a smartphone application of the virtual smartphone instance, wherein the portable interface device comprises a wearable heads-up display including an eye tracker configured to control the virtual smartphone instance.

11. The method of claim 10 wherein the host server is part of a content delivery network, and wherein storing, at the host server, the plurality of virtual smartphone instances includes edge caching the plurality of virtual smartphone instances in the content delivery network.

12. The method of claim 10 wherein executing the smartphone application by the portable interface device includes at least one of:
   sending a message from the unique phone number of the virtual smartphone instance by the portable interface device; and/or
   receiving a message at the unique phone number of the virtual smartphone instance by the portable interface device.

13. The method of claim 10 wherein establishing a communications link between the host server and a portable interface device includes establishing a cellular link between the host server and the portable interface device, the cellular link mediated by at least one cellular antenna.

14. The method of claim 10, wherein the portable interface device comprises a smartwatch.

\* \* \* \* \*

UNITED STATES PATENT AND TRADEMARK OFFICE
CERTIFICATE OF CORRECTION

PATENT NO. : 11,553,044 B2
APPLICATION NO. : 17/072375
DATED : January 10, 2023
INVENTOR(S) : Stefan Alexander et al.

It is certified that error appears in the above-identified patent and that said Letters Patent is hereby corrected as shown below:

In the Claims

At Column 22 Line 01, please correct "plurality" to be --a plurality--

At Column 22 Line 19, please correct "device devices" to be --devices--

Signed and Sealed this
Sixteenth Day of April, 2024

Katherine Kelly Vidal
*Director of the United States Patent and Trademark Office*